(12) United States Patent
Chen

(10) Patent No.: US 8,013,747 B2
(45) Date of Patent: Sep. 6, 2011

(54) DRIVING SAFETY WARNING METHOD AND DEVICE FOR A DROWSY OR DISTRACTED DRIVER

(75) Inventor: Wen-Chi Chen, Hsinchu (TW)

(73) Assignee: Arima Communications Corp., Taipei (TW)

( * ) Notice: Subject to any disclaimer, the term of this patent is extended or adjusted under 35 U.S.C. 154(b) by 486 days.

(21) Appl. No.: 12/236,893

(22) Filed: Sep. 24, 2008

(65) Prior Publication Data
US 2010/0073155 A1 Mar. 25, 2010

(51) Int. Cl.
*G08B 21/00* (2006.01)
(52) U.S. Cl. .......................... 340/576; 701/301; 180/272
(58) Field of Classification Search .................. 340/435, 340/436, 439, 441, 576; 701/301; 180/272
See application file for complete search history.

(56) References Cited

U.S. PATENT DOCUMENTS

| | | | | |
|---|---|---|---|---|
| 4,594,583 A | * | 6/1986 | Seko et al. | ..................... 340/576 |
| 2007/0152804 A1 | * | 7/2007 | Breed et al. | ................... 340/435 |

* cited by examiner

*Primary Examiner* — Jeffery Hofsass
(74) *Attorney, Agent, or Firm* — Muncy, Geissler, Olds & Lowe, PLLC

(57) ABSTRACT

A driving safety warning device includes a central processing unit (CPU); an acceleration sensor for sensing an acceleration value of a car having the driving safety warning device installed therein, and sending the sensed acceleration value to the CPU for calculating, so as to obtain a driving speed value; and a gyro sensor for sensing a deviation angular speed value of the car in moving, and sending the sensed deviation angular speed value to the CPU for calculating. When the obtained driving speed value exceeds a preset value, a driving safety warning function is actuated; and when the obtained deviation angular speed value exceeds a preset maximum safety deviation angular speed value or exceeds a preset safety deviation angular speed value for wandering car while a timer is enabled and a reverse sway occurs when the timer is counting, a warning sound is emitted to remind the driver.

11 Claims, 7 Drawing Sheets

DRIVING SAFETY WARNING METHOD AND DEVICE FOR A DROWSY OR DISTRACTED DRIVER

FIELD OF THE INVENTION

The present invention relates to a driving safety warning device and method, and more particularly, to a driving safety warning device and method that emits a warning sound in a dangerous driving condition to avoid accident.

BACKGROUND OF THE INVENTION

Accident often occurs when a tired and/or distracted driver suddenly drives a car into other lanes on a road, a highway, or a freeway. Currently, the technique of using supersonic wave to detect a safe distance between two moving cars has been used to achieve the purpose of driving safety warning. However, for two cars that are moving at high speed, the response time for maintaining a fixed distance between cars is relatively short. Therefore, the safety of driving at high speed is relatively low. In addition, most of the currently available driving safety warning means are of a visual type. That is, the driver has to visually determine the current driving speed and surrounding factors in connection with driving. Such visual-type driving safety warning means are just insufficient for handling unexpected conditions or accidents. Satellite positioning has also been utilized to calculate the safe distance between two moving cars to avoid collision. However, the satellite positioning technique seems not workable in practical application of it to the driving safety warning. In addition, photographic information has also been used to analyze the environmental factors surrounding a car, and image parameters are used to provide the current driving conditions of the car, so as to determine whether the car has been excessively turned or deviated from the original lane.

SUMMARY OF THE INVENTION

A primary object of the present invention is to provide a driving safety warning device and method that enables emitting of a warning sound to remind a driver of a dangerous driving condition when a car in moving exceeds a preset driving speed value, a preset maximum safety deviation angular speed value, and/or a preset safety deviation angular speed value for wandering car, so as to avoid an accident due to sudden deviation of the car from the lane or wandering of the car in the road caused by a dozing or distracted driver.

To achieve the above and other objects, the driving safety warning method according to the present invention includes the following steps:
switching on a driving safety warning device installed in a car to enable a driving safety warning program for the device; the driving safety warning device determining whether a current driving speed value of the car exceeds a preset value; if yes, a driving safety warning function of the device being actuated; the driving safety warning device determining whether a current deviation angular speed value of the car exceeds a preset maximum safety deviation angular speed value; if yes, a warning sound being emitted;
the driving safety warning device determining whether the car exceeds a preset safety deviation angular speed value for wandering car;
if yes, further determining whether a timer of the device is enabled and a reverse sway occurs while the timer is counting; and
if yes, a warning sound being emitted.

Further, a step of reading in a preset warning-actuating driving speed value, a preset maximum safety deviation angular speed value, and a preset safety deviation angular speed value for wandering car is executed before the step of determining whether the current driving speed value of the car exceeds a preset value.

In the method of the present invention, the current driving speed value is obtained by sensing an acceleration value of the car with an acceleration sensor and calculating the sensed acceleration value with a CPU.

In the method of the present invention, the current deviation angular speed value of the car is obtained by sensing a deviation angular speed of the car with a gyro sensor.

In the method of the present invention, in the step of emitting a warning sound when the timer is enabled and a reverse sway occurs while the timer is counting, the timer is reset and then enabled again to count.

And, the driving safety warning device according to the present invention includes a central processing unit (CPU); an acceleration sensor for sensing a current acceleration value of a car, in which the driving safety warning device is installed, and sending the sensed acceleration value to the CPU for calculating, so as to obtain a driving speed value, and a driving safety warning function being actuated when the obtained acceleration value exceeds a preset value; and a gyro sensor for sensing a current deviation angular speed value of the car in moving, and sending the sensed deviation angular speed value to the CPU for calculating, and a warning sound being emitted when the obtained deviation angular speed value either exceeds a preset maximum safety deviation angular speed value or exceeds a preset safety deviation angular speed value for wandering car while a timer is enabled and a reverse sway occurs while the timer is counting.

The driving safety warning device according to the present invention further includes an input unit for inputting a warning-actuating driving speed, a maximum safety deviation angular speed value, and a safety deviation angular speed value for wandering car; a display for displaying different values; and a memory for memorizing the values.

With the driving safety warning device and method of the present invention, a warning sound can be emitted to remind a driver of a dangerous driving condition when the car in moving exceeds the preset driving speed value, the preset maximum safety deviation angular speed value, and/or the preset safety deviation angular speed value for wandering car, so as to avoid an accident due to sudden deviation of the car from the lane or wandering of the car in the road caused by a dozing or distracted driver.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
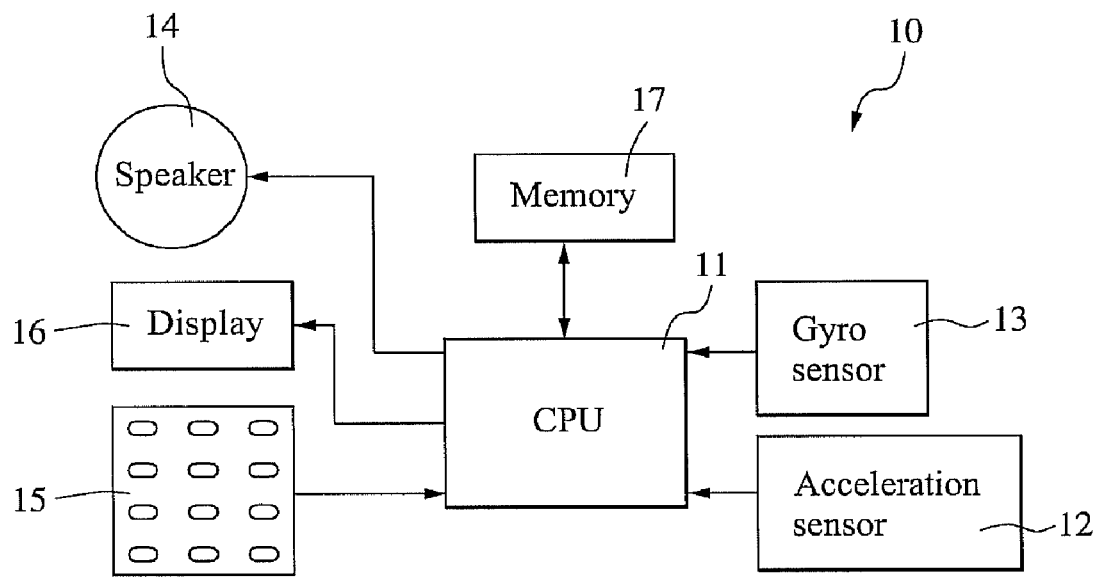
FIG. 1 is a block diagram of a driving safety warning device according to a preferred embodiment of the present invention.

Please refer to FIG. 1 that is a block diagram of a driving safety warning device 10 according to a preferred embodiment of the present invention. To use the driving safety warning device 10, first switch it on. The driving safety warning device 10 can be installed in a cellular phone to be conveniently carried by a driver while also giving the cellular phone additional-value. In this case, the cellular phone must be equipped with a gyro sensor 13 and an acceleration sensor 12. Alternatively, the driving safety warning device 10 can be installed in a car as part of the equipment thereof to also give the car increased value.

As shown in FIG. 1, the driving safety warning device 10 includes a central processing unit (CPU) 11, an acceleration sensor 12, and a gyro sensor 13. The acceleration sensor 12 senses current driving speed to obtain an acceleration value, which is sent to the CPU 11 for computing to get a driving speed value. When the driving speed value exceeds a preset value, a series of driving safety warning steps are actuated. The gyro sensor 13 senses a current driving condition to obtain a deviation angular speed value, and sends the same to the CPU 11 for calculating. When the sensed deviation angular speed value exceeds a maximum safety deviation angular speed value, a warning sound is emitted. Or, when the sensed deviation angular speed value exceeds a safety deviation angular speed value for wandering car while a timer is enabled and a reverse sway occurs when the timer is counting, a warning sound would be emitted via a speaker 14 to remind the driver of a dangerous driving condition.

The driving safety warning device 10 further includes an input unit 15, via which a warning-actuating driving speed value, a maximum safety deviation angular speed value, and a safety deviation angular speed value for wandering car can be preset. The driving safety warning device 10 further includes a display 16 for displaying different values, and a memory 17 for memorizing all the preset values.

Figure 2:
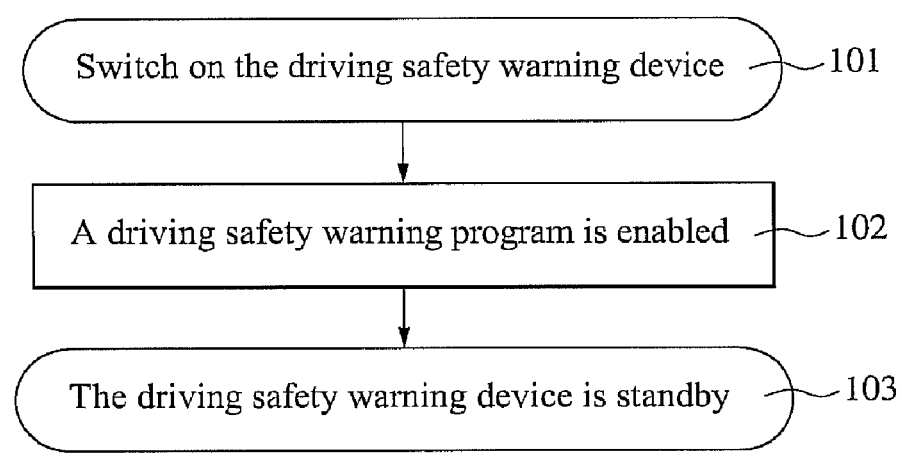
FIG. 2 is a flowchart showing the steps for enabling the driving safety warning device of the present invention.

FIG. 2 is a flowchart showing the steps for enabling the driving safety warning device 10. To enable the driving safety warning device 10, first switch on the driving safety warning device 10 (Step 101), and a driving safety warning program is automatically enabled (Step 102). Then, the device 10 automatically enters into a standby state (Step 103).

Figure 3:
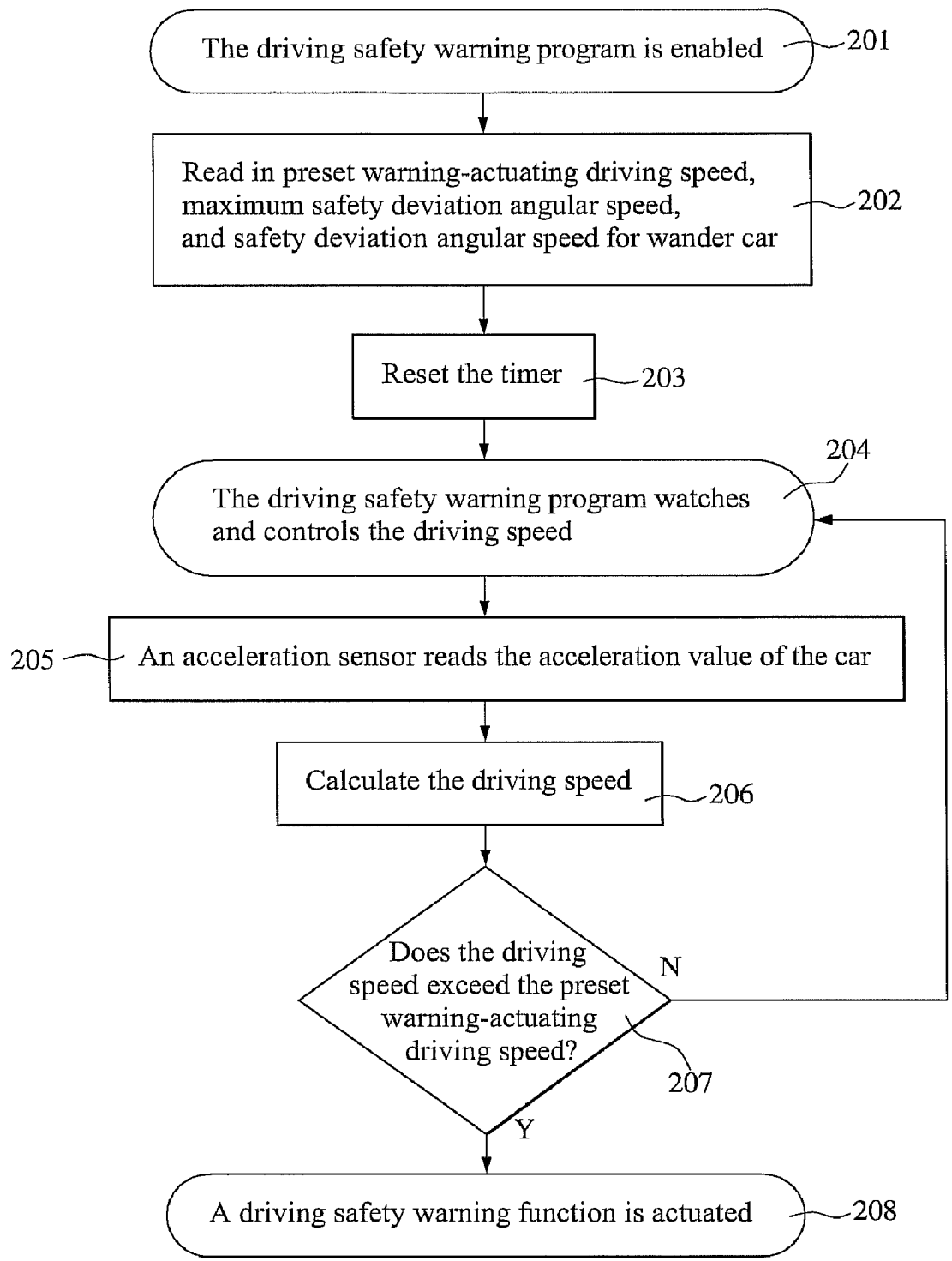
FIG. 3 is a flowchart showing the steps included in a driving safety warning method according to the present invention for determining a current driving speed.

FIG. 3 is a flowchart showing the steps included in a driving safety warning method according to the present invention for determining current driving speed of a car. When the driving safety warning device 10 is switched on to automatically enable the driving safety warning program (Step 201), the device 10 will read in the preset warning-actuating driving speed value, maximum safety deviation angular speed value, and safety deviation angular speed value for wandering car (Step 202). Then, a timer is reset (Step 203), and the enabled driving safety warning program can assist a driver in watching and controlling driving speed at any time (Step 204). At this point, the acceleration sensor 12 keeps sensing the acceleration value of the car (Step 205), and sends the sensed acceleration value to the CPU 11 for calculating to obtain a driving speed value (Step 206). The CPU 11 will then determine whether the obtained driving speed value exceeds a preset value or not (Step 207). If no, the Step 204 of watching and controlling driving speed is repeated; or, if yes, a driving safety warning function is actuated (Step 208). In the present invention, the driving speed value is obtained by using the acceleration sensor 12 to sense an acceleration value and using the CPU 11 to calculate the sensed acceleration value.

For example, it can be set for the driving safety warning device 10 to be enabled when a car has a driving speed of 60 km/hour. Therefore, when the car has a driving speed lower than 60 km/hour, the driving safety warning device 10 would not be enabled. In this manner, wrong warning due to too many curves in the road while driving in urban areas can be avoided.

Figure 4:
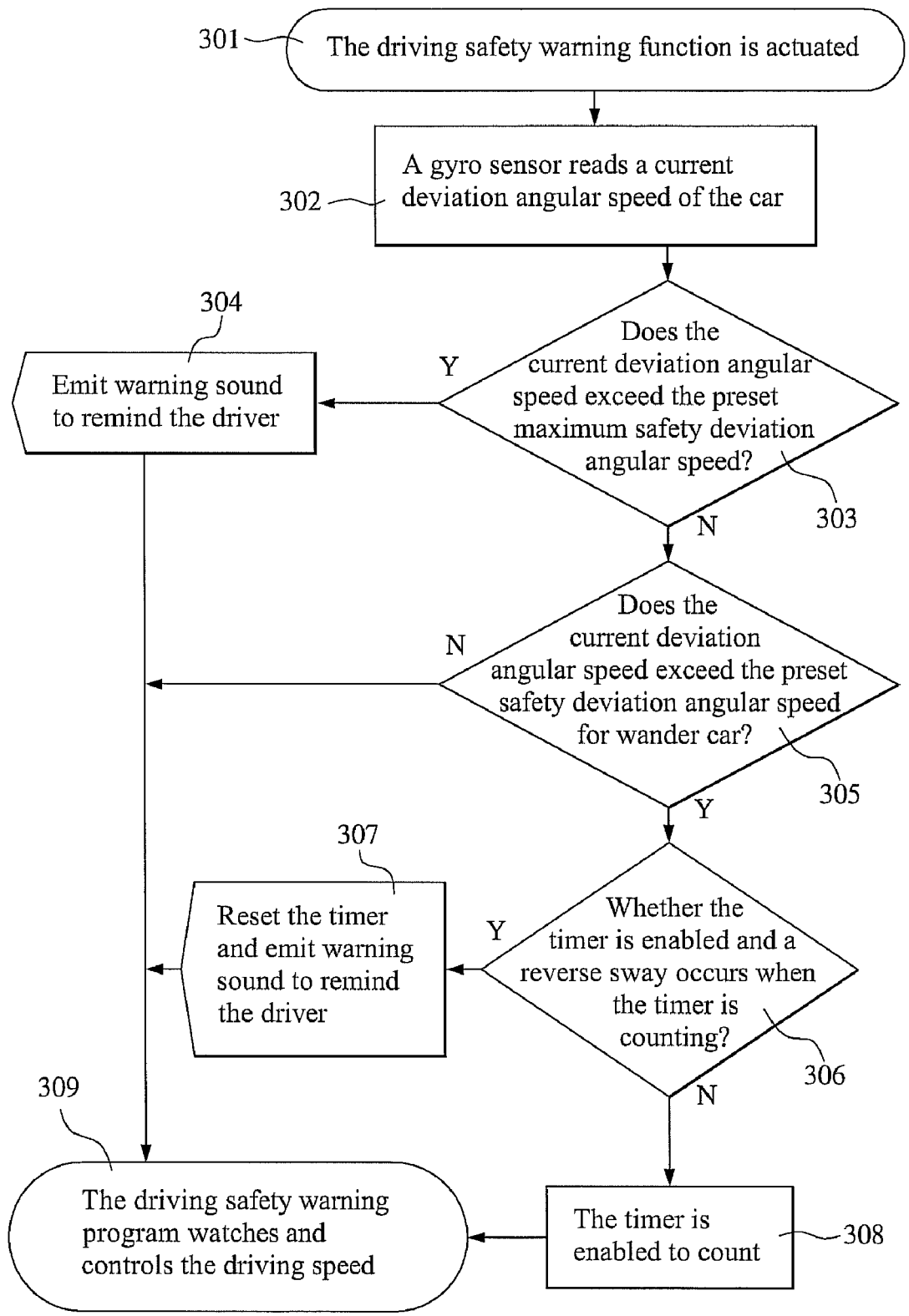
FIG. 4 is a flowchart showing the steps included in a driving safety warning method according to the present invention when a driving safety warning function is actuated.

FIG. 4 is a flowchart showing the steps included in a driving safety warning method according to the present invention when the driving safety warning function is actuated. When the driving safety warning device 10 is enabled and the driving safety warning function is actuated (Step 301), the gyro sensor 13 will keep sensing the current deviation angular speed value of the car (step 302), and sends the sensed deviation angular speed value to the CPU 11 for the latter to determine whether the car in moving has exceeded the preset maximum safety deviation angular speed value (Step 303). If yes, a warning sound is emitted to remind the driver of the dangerous driving condition (Step 304); or, if no, the CPU 11 further determines whether the car in moving has exceeded the preset safety deviation angular speed value for wandering car (Step 305). If no, the enabled driving safety warning program will keep watching and controlling the driving speed (Step 309); or, if yes, the CPU 11 further determines whether the timer is already enabled and a reverse sway occurs while the timer is counting (Step 306). If yes, the timer is reset and a warning sound is emitted to remind the driver of a dangerous driving condition; or, if no, the timer is enabled to count (Step 308), and the driving safety warning program keeps watching and controlling the driving speed (Step 309). In the present invention, the deviation angular speed value is obtained through the sensing by the gyro sensor 13.

Figure 5:
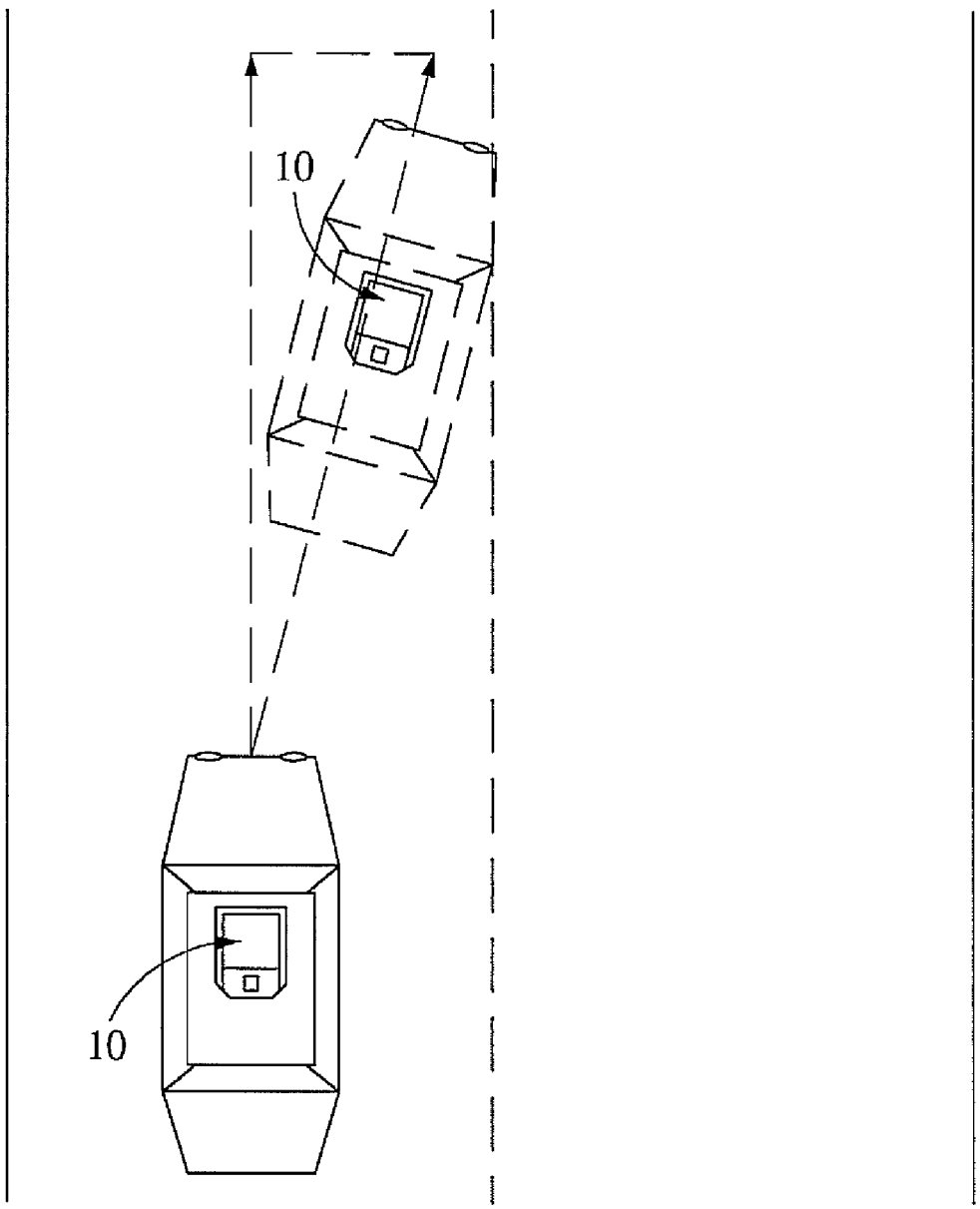
FIG. 5 schematically shows a first driving condition in connection with the driving safety warning function in the method of the present invention.

FIG. 5 schematically shows a first driving condition in connection with the driving safety warning function in the method of the present invention. When a car having the driving safety warning device 10 installed therein is moving forward straightly, the driving safety warning device 10 would not act. However, when the driver changes the car to a different lane, the gyro sensor 13 of the driving safety warning device 10 will sense the current deviation angular speed value of the car. In the event the sensed current deviation angular speed value does not exceed the preset maximum safety deviation angular speed value for the car, the driving safety warning device 10 will not emit any warning sound.

Figure 6:
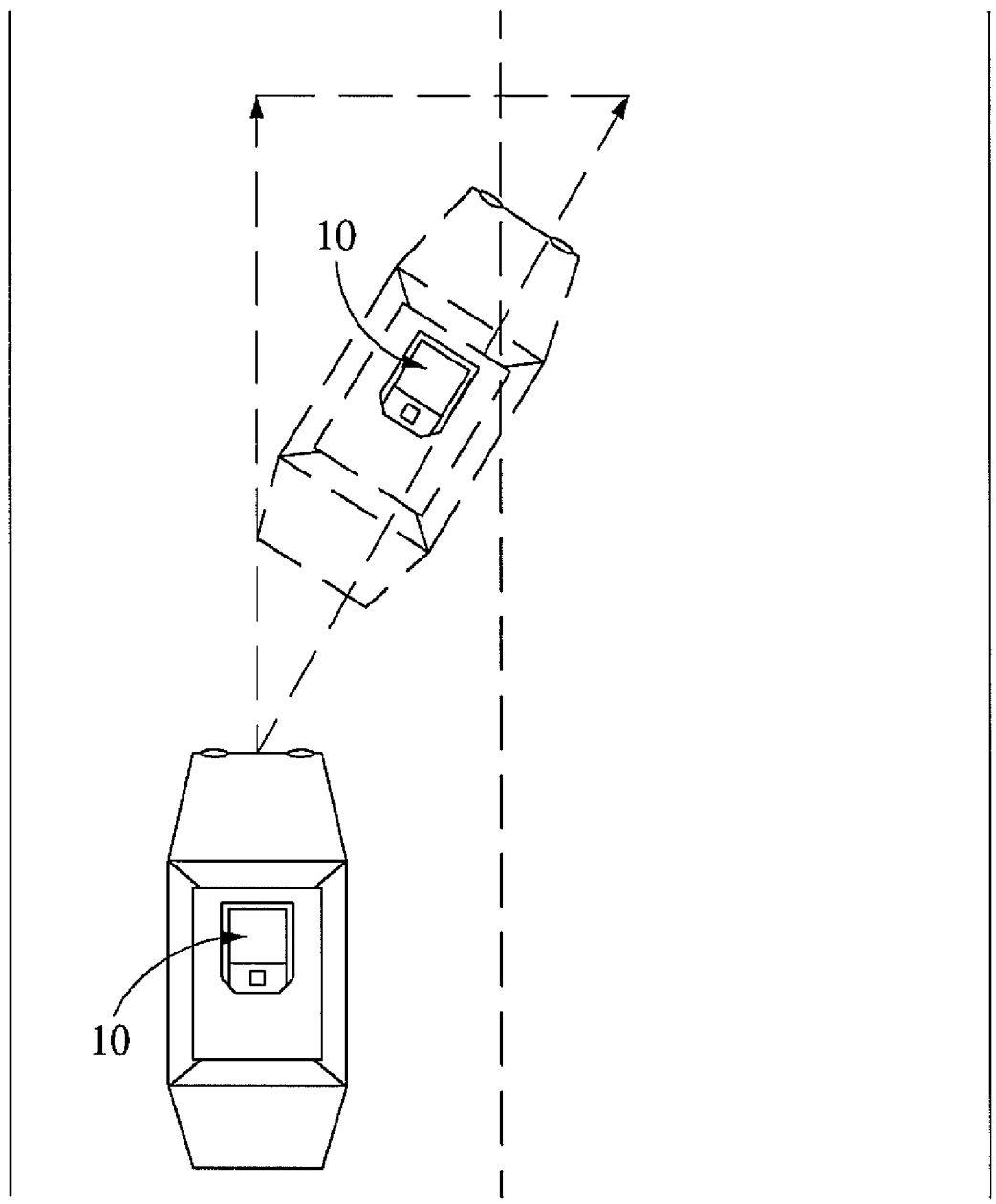
FIG. 6 schematically shows a second driving condition that would actuate the driving safety warning function in the method of the present invention.

FIG. 6 schematically shows a second driving condition that would actuate the driving safety warning function in the method of the present invention. When a car having the driving safety warning device 10 installed therein is moving forward straightly, the driving safety warning device 10 would not act. However, when the car is moving and the gyro sensor 13 senses the current deviation angular speed value of the car exceeds the preset maximum safety deviation angular speed value for the car, the driving safety warning device 10 will emit a warning sound to remind the driver of a dangerous driving condition, preventing the driver from dozing or becoming distracted during driving and thereby avoiding sudden deviation of the car from the lane. In a worse condition, the suddenly deviated car might collide with other cars in the lane to the right side of the driver.

Figure 7:
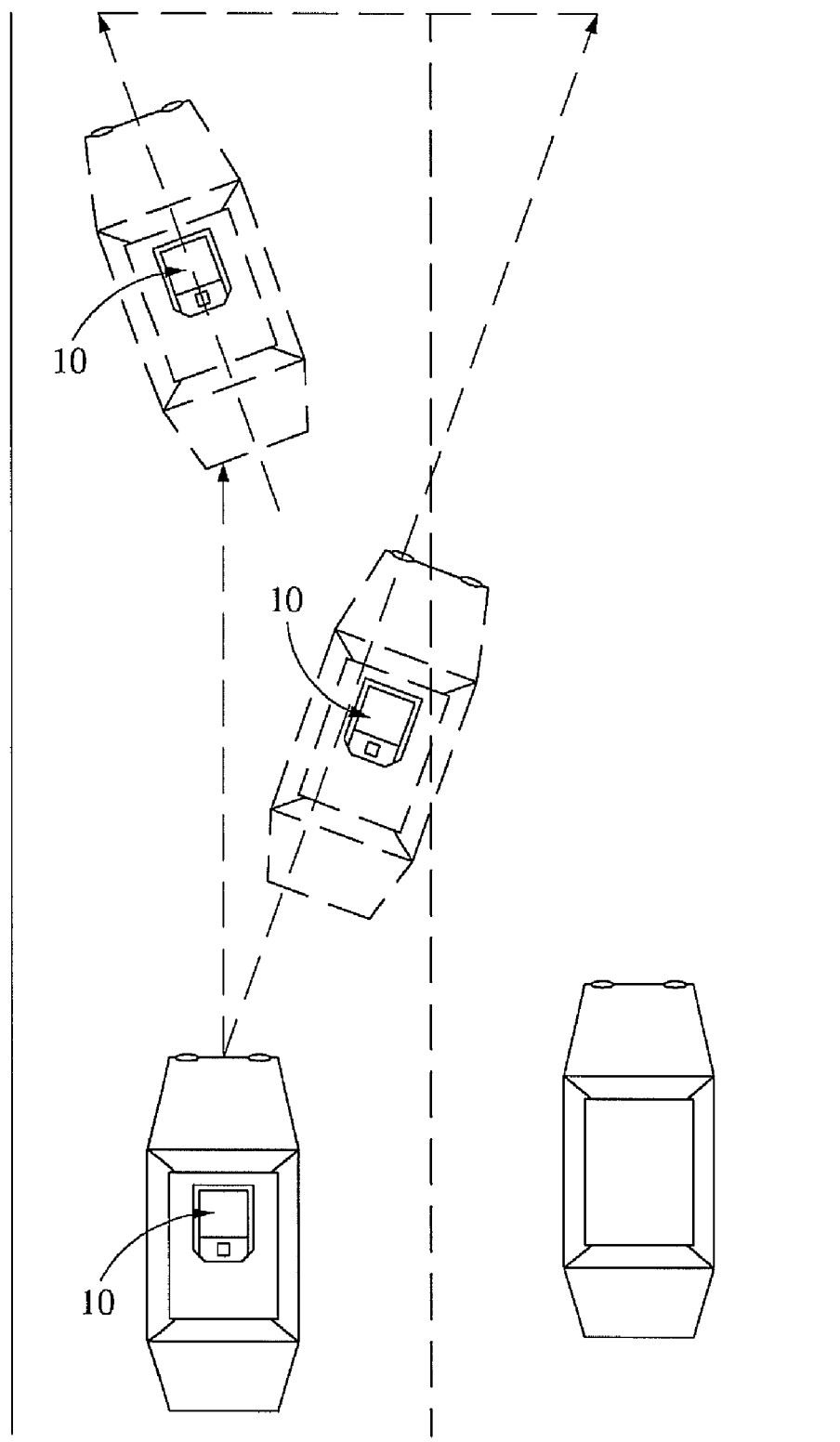
FIG. 7 schematically shows a third driving condition that would actuate the driving safety warning function in the method of the present invention.

FIG. 7 schematically shows a third driving condition that would actuate the driving safety warning function in the method of the present invention. When a car having the driving safety warning device 10 installed therein is moving forward straightly, the driving safety warning device 10 would not act. However, when the car is wandering to exceed the preset maximum safety deviation angular speed value therefor, the driving safety warning device 10 will emit a warning sound to remind the driver of a dangerous driving condition. In the event the wandering car has a current deviation angular speed value exceeded the preset maximum positive and negative safety deviation angular speed values for wander car, such as +/−15°/sec, over a preset time period, such as 3 seconds, the device 10 will emit a warning sound to remind the driver, so as to avoid any accident due to excessive wandering. In a worse condition, the car might collide with other cars in the lane to the right side of the driver.

Figure 8:
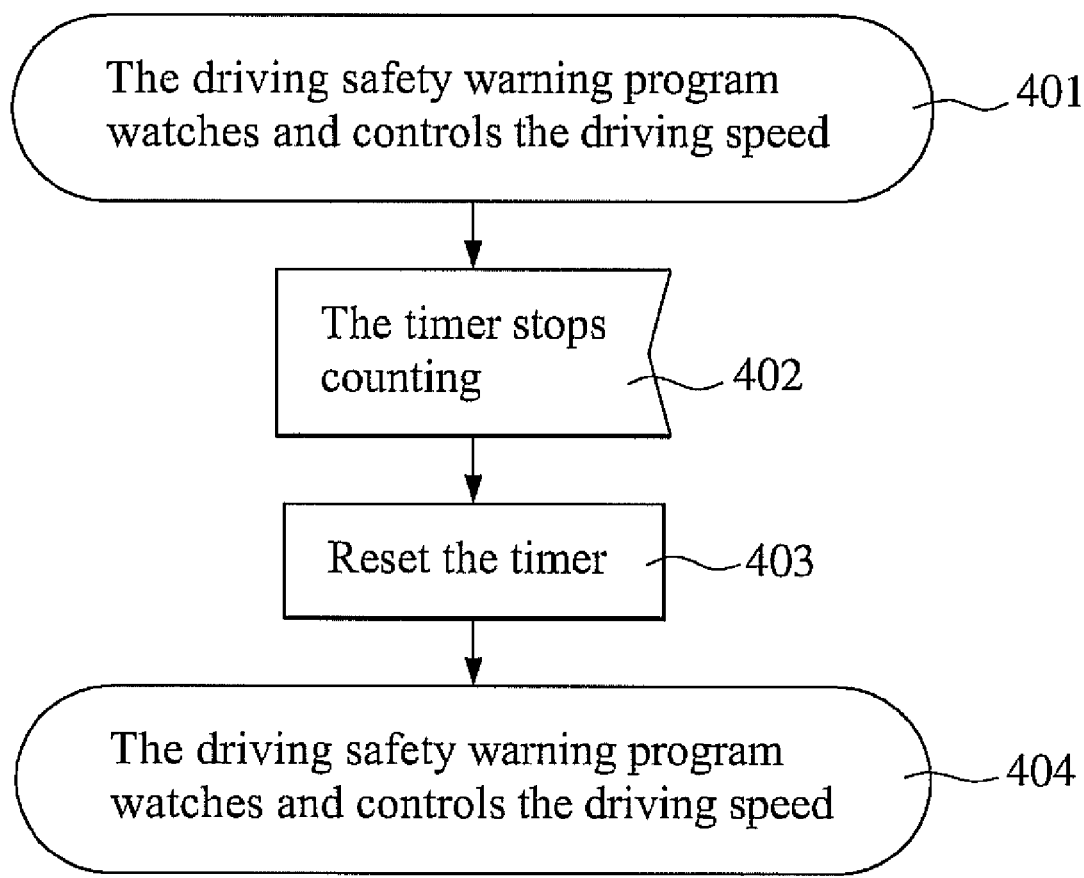
FIG. 8 is a flowchart showing the steps included in a driving safety warning method according to the present invention for watching and controlling driving speed.

FIG. 8 is a flowchart showing the steps included in a driving safety warning method according to the present invention for watching and controlling driving speed. When the driving safety warning program of the device 10 is enabled for watching and controlling the car driving speed (Step 401), the timer stops counting (Step 402) and is reset (Step 403), and the driving safety warning program keeps watching and controlling the car driving speed (Step 404).

In brief, with the present invention, a safety deviation angular speed value is preset according to the car driving speed. Therefore, when the car exceeds the preset maximum safety deviation angular speed value while moving, or when the car exceeds the preset safety deviation angular speed value for wandering car while moving, the driving safety warning device of the present invention will emit a warning sound to remind the driver of a dangerous driving condition, preventing the driver from dozing or becoming distracted during driving and thereby avoiding an accident due to a sudden deviation of the car from the lane.

What is claimed is:

1. A driving safety warning method comprising:
switching on a driving safety warning device installed in a car to enable a driving safety warning program for the device, the driving safety warning device performing the following steps:
determining whether a driving speed value of the car exceeds a preset driving speed value and, if the preset driving speed value is exceeded, actuating a driving safety warning function of the device;
determining whether a deviation angular speed value of the car exceeds a preset maximum safety deviation angular speed value and, if the preset maximum safety deviation angular speed value is exceeded, emitting a warning sound;
determining whether a deviation angular speed value of the car exceeds a preset safety deviation angular speed value for a wandering car and, if the preset safety deviation angular speed value for a wandering car is exceeded, further determining whether a timer of the device is enabled and a reverse sway occurs while the timer is counting, and, if a timer of the device is enabled and a reverse sway occurs while the timer is counting, emitting a warning sound.

2. The driving safety warning method as claimed in claim 1, further comprising the step of reading in a preset driving speed value, a preset maximum safety deviation angular speed value, and a preset safety deviation angular speed value for a wandering car before the step of determining whether the driving speed value of the car exceeds a preset value.

3. The driving safety warning method as claimed in claim 2, further comprising a step of resetting the timer after the step of reading in the preset values.

4. The driving safety warning method as claimed in claim 1, wherein the driving speed value is obtained by sensing an acceleration value of the car with an acceleration sensor and calculating the sensed acceleration value with a central processing unit CPU.

5. The driving safety warning method as claimed in claim 1, wherein the deviation angular speed value of the car is obtained by sensing a deviation angular speed of the car with a gyro sensor.

6. The driving safety warning method as claimed in claim 1, wherein, in the step of emitting a warning sound when the timer is enabled and a reverse sway occurs while the timer is counting, the timer is reset and counting is re-enabled.

7. A driving safety warning device, comprising:
a central processing unit (CPU);
an acceleration sensor for sensing an acceleration value of a car in which the driving safety warning device is installed, and sending the sensed acceleration value to the CPU for calculating, so as to obtain a driving speed value, wherein a driving safety warning function is actuated when the obtained driving speed value exceeds a preset value; and
a gyro sensor for sensing a deviation angular speed value of the moving car, and sending the sensed deviation angular speed value to the CPU for calculating, wherein a warning sound is emitted when the calculated deviation angular speed value either exceeds a preset maximum safety deviation angular speed value or exceeds a preset safety deviation angular speed value for a wandering car while a timer is enabled and a reverse sway occurs when the timer is counting.

8. The driving safety warning device as claimed in claim 7, wherein the warning sound is emitted via a speaker.

9. The driving safety warning device as claimed in claim 7, further comprising an input unit for inputting a driving speed value, a maximum safety deviation angular speed value, and a safety deviation angular speed value for a wandering car.

10. The driving safety warning device as claimed in claim 7, further comprising a display for displaying different values.

11. The driving safety warning device as claimed in claim 7, further comprising a memory.

* * * * *